United States Patent
Yatsuzuka et al.

(10) Patent No.: US 8,268,420 B2
(45) Date of Patent: Sep. 18, 2012

(54) WRAP FILM MADE OF POLYVINYLIDENE CHLORIDE-BASED RESIN AND PROCESS FOR PRODUCING THE SAME

(75) Inventors: Michihiro Yatsuzuka, Tokyo (JP); Hisaaki Kobayashi, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 406 days.

(21) Appl. No.: 12/528,216

(22) PCT Filed: Mar. 12, 2008

(86) PCT No.: PCT/JP2008/054534
§ 371 (c)(1),
(2), (4) Date: Aug. 21, 2009

(87) PCT Pub. No.: WO2008/111618
PCT Pub. Date: Sep. 18, 2008

(65) Prior Publication Data
US 2010/0062197 A1    Mar. 11, 2010

(30) Foreign Application Priority Data
Mar. 12, 2007  (JP) .................................. 2007-061380

(51) Int. Cl.
*B32B 27/30*        (2006.01)
(52) U.S. Cl. ...... 428/35.4; 428/35.2; 264/558; 264/514; 264/515
(58) Field of Classification Search ............... 428/35.4; 264/558, 514, 515
See application file for complete search history.

(56) References Cited

U.S. PATENT DOCUMENTS
| | | | |
|---|---|---|---|
| 4,581,152 A * | 4/1986 | Hotta et al. | 252/78.5 |
| 2002/0014717 A1 | 2/2002 | Kling et al. | |

FOREIGN PATENT DOCUMENTS
| | | |
|---|---|---|
| CA | 510500 | 3/1955 |
| EP | 03 38 350 B1 | 3/1992 |
| JP | 27-002793 | 7/1952 |
| JP | 2-49036 | 2/1990 |
| JP | 10-330625 | 12/1998 |
| JP | 2002-331623 | 11/2002 |
| JP | 2002-539986 | 11/2002 |
| WO | 2007/018204 A1 | 2/2007 |

OTHER PUBLICATIONS
International Search Report issued in connection with PCT/JP2008/054534, mailed Apr. 22, 2008.
International Preliminary Report on Patentability issued in connection with PCT/JP2008/054534, mailed Oct. 8, 2009.

* cited by examiner

*Primary Examiner* — Rena Dye
*Assistant Examiner* — Yan Lan
(74) *Attorney, Agent, or Firm* — Greenblum & Bernstein, PLC

(57) ABSTRACT

A wrap film having very stable physical properties wherein a sock liquid maintains the lubricating effect as an opening agent while a sock is stabilized and parison width changes and meandering are reduced to eliminate parison wrinkles is provided. Specifically, the wrap film is a wrap film made of a polyvinylidene chloride-based resin prepared by melt-extruding a polyvinylidene chloride-based resin from a die in tubular form, cooling the outer side of the extrudate by using a coolant while an aqueous solution of a liquid that is compatible with water and forms one-component is retained in the hollow portion of the extrudate, and inflating the solidified extrudate, wherein the liquid that is compatible with water and forms one-component has a concentration of 80 to 95% by mass in the aqueous solution, and the liquid is applied to the wrap film in amounts of 50 to 4,000 ppm.

3 Claims, 2 Drawing Sheets

WRAP FILM MADE OF POLYVINYLIDENE CHLORIDE-BASED RESIN AND PROCESS FOR PRODUCING THE SAME

TECHNICAL FIELD

The present invention relates to a wrap film used for the simple packaging of foods and the like, and more particularly to a wrap film having very stable physical properties wherein the lubricating effect of a sock liquid as an opening agent is maintained while a sock is stabilized and parison width changes and meandering are reduced to eliminate parison wrinkles by controlling the amount of an applied liquid that is compatible with water and forms one-component to a specific amount, and a process for producing the wrap film.

BACKGROUND ART

Conventionally, wrap films made of a polyvinylidene chloride-based resin have been used as materials for the simple packaging of foods and the like in many ordinary households because the films have excellent adhesion to adherends and each other and properties such as gas barrier properties.

Usually, an inflation film formation process is widely used to produce a wrap film made of a polyvinylidene chloride-based resin. In an inflation film formation process, the resin is extruded from a die in tubular form, and then the outer side of the resin in tubular form is usually brought into contact with a coolant such as cold water filling a storage tank called a cold water bath. At the time, the coolant is injected into and retained in the inside of the tubular (cylindrical) resin held between a die opening and a pinch roll, and at the same time the inner side of the resin is brought into contact with a coolant such as a mineral oil to cool and solidify the resin into a film. As used herein, the tubular resin portion held between the die opening and the pinch roll is called a sock. The coolant (liquid) injected into the inside of the sock is called a sock liquid. Here, the sock is collapsed by the pinch roll to form a tubular double-ply sheet, and this double-ply sheet is called a parison.

To obtain a stretched film by the production process above, this parison is reheated and stretched by blowing air into the inside of the parison (inflation) (hereinafter also referred to as inflation stretching). At the time, reopening the parison collapsed once requires providing the sock liquid with the lubricating effect as an opening agent. In addition, separating the stretched double-ply film into a single-ply film also requires providing the sock liquid with the lubricating effect as an opening agent.

In general, for inflation stretching, a method that uses a mineral oil as the sock liquid is known. Because a mineral oil has a lower specific gravity than water, cooling increases the pressure from the outer side to the inner side of the sock, making it impossible to provide the sock with tension. As a result, unfortunately, when the sock is collapsed by the pinch roll to form a parison, wrinkles (called parison wrinkles) form thereon, inducing a blowout due to inflation stretching, and making the sock unstable because the water pressure of the cold water bath causes the sock to pulsate and the like.

To solve these problems, a method that uses a mineral oil along with water, ethylene glycol, or propylene glycol is widely known, as disclosed by Patent Document 1.

Moreover, Patent Document 2 proposes a technique using a cellulose-based aqueous solution and Patent Document 3 proposes a technique using a polyvinyl alcohol-based aqueous solution as a sock liquid that uses no mineral oil having a low specific gravity, has the lubricating effect as an opening agent, and forms one-component.

In addition, Patent Document 4 describes a conventional technique using propylene glycol, glycerin, or the like in undiluted form or in aqueous form as a sock liquid.

Moreover, Patent Document 5 describes that propylene glycol or dipropylene glycol is used as a solvent for a dusting agent. Patent Document 5 describes that the use of an inorganic powder for a dusting agent improves the opening properties of a parison.

Patent Document 1: Japanese Patent Publication No. 27-2793
Patent Document 2: Published Japanese Translation No. 2002-539986 of the PCT International Application
Patent Document 3: Japanese Patent Application Laid-Open No. 2002-331623
Patent Document 4: Japanese Patent Application Laid-Open No. 10-330625
Patent Document 5: Japanese Patent Application Laid-Open No. 2-49036

DISCLOSURE OF THE INVENTION

Problems to be Solved by the Invention

However, in the method described in Patent Document 1, mineral oil is incompatible with water and the like, so they are separated into two phases in the inside of the sock. For this reason, the sock liquid is nonuniform and uneven coating occurs when the sock liquid is applied to the inner sock wall, leading to variations in the physical properties of the wrap film produced. In addition, the mineral oil in oil phase transported to the bottom along the inner sock wall is squeezed by the pinch roll and returns to the upper portion of the sock. Unfortunately, the vertical movement of the mineral oil at the time causes the liquid inside the sock, then the sock itself to shake, resulting in greater parison width changes and meandering and the frequent occurrence of parison wrinkles.

Furthermore, when the aqueous solutions described in Patent Documents 2 and 3 are used, sock cooling cannot keep pace in a production facility having a high output rate. If the portion of the sock liquid that is in contact with the sock, especially with the sock immediately after extrusion (hereinafter also referred to as a molten parison) has a temperature higher than 100° C., the sock liquid boils because the sock liquid is a cellulose-based or polyvinyl alcohol-based aqueous solution. As a result, there is a problem that the sock is unstable because of sock destruction, pulsation, or the like.

Moreover, according to the conventional film formation method that uses the sock liquid described in Patent Document 4 as it is, the amount of a sock liquid applied to the sock definitely cannot be controlled. As a result, there are problems that sometimes a too small amount of the sock liquid applied causes poor opening of the parison, and at other times a too large amount of the sock liquid applied whitens the formed film. The poor opening of the parison makes it impossible to provide stable, continuous stretching thereafter, failing to produce a film. In addition, although a formed film that whitens presents no particular problem for industrial materials, the film cannot satisfy customer demands for wrap films whose major use is food wrapping because their clarity is also strongly required.

In addition, in Patent Document 5, the dusting agent contains a large amount of an inorganic powder, and the inorganic powder is left on the film surface, causing loss of film clarity and thereby failing to satisfy the physical properties that wrap films are required to have. Moreover, Patent Document 5 does not discuss controlling the amount of propylene glycol or dipropylene glycol itself applied and thus does not solve the problem relating to too small and large amounts applied, as in Patent Document 4.

These problems prevent productivity and film physical properties that are of practical value from being compatible in real-world situations, so the methods described in the Patent Documents above have not yet been brought into practical use.

An object of the present invention is to provide a wrap film made of a polyvinylidene chloride-based resin having very stable physical properties by maintaining the lubricating effect of a sock liquid as an opening agent, stabilizing the sock, and reducing parison width changes and meandering to eliminate parison wrinkles, and a process for producing the wrap film.

Means for Solving the Problems

The present inventors have conducted extensive studies in view of stabilizing the sock and found that to achieve the object, the composition of a sock liquid applied to the inner side of a polyvinylidene chloride-based resin composition (specific gravity, 1.6 to 1.8 g/cm$^3$) that is melt-extruded in tubular form needs only to be made specific. This maintains the lubricating effect of the sock liquid as an opening agent, stabilizes the sock, and reduces parison width changes and meandering to eliminate parison wrinkles for quality stabilization, and greatly reduces parison wrinkles to eliminate the causes of the blowout.

Specifically, the present invention is as follows:
1. A wrap film made of a polyvinylidene chloride-based resin prepared by melt-extruding a polyvinylidene chloride-based resin from a die in tubular form, cooling the outer side of the extrudate by using a coolant while an aqueous solution of a liquid that is compatible with water and forms one-component is retained in the hollow portion of the extrudate, and inflating the solidified extrudate, wherein the liquid that is compatible with water and forms one-component has a concentration of 80 to 95% by mass in the aqueous solution and the wrap film has the liquid in applied state in amounts of 50 to 4,000 ppm.
2. The wrap film made of a polyvinylidene chloride-based resin according to 1., wherein the wrap film has the liquid that is compatible with water and forms one-component in applied state in amounts of 50 to 3,000 ppm.
3. The wrap film made of a polyvinylidene chloride-based resin according to 1. or 2., wherein the liquid that is compatible with water and forms one-component has a specific gravity of greater than 1.0 and 1.3 or less at 20° C.
4. The wrap film made of a polyvinylidene chloride-based resin according to any of 1. to 3., wherein the liquid that is compatible with water and forms one-component has a boiling point of 150° C. or more.
5. The wrap film made of a polyvinylidene chloride-based resin according to any of 1. to 4., wherein the liquid that is compatible with water and forms one-component is propylene glycol.
6. The wrap film made of a polyvinylidene chloride-based resin according to any of 1. to 4., wherein the liquid that is compatible with water and forms one-component is one or more propylene glycol multimers selected from the group consisting of dipropylene glycol, tripropylene glycol, and polypropylene glycol having an weight-average molecular weight of 350 to 450.
7. The wrap film made of a polyvinylidene chloride-based resin according to 6., wherein the propylene glycol polymers are dipropylene glycol.
8. A process for producing a wrap film made of a polyvinylidene chloride-based resin prepared by melt-extruding a polyvinylidene chloride-based resin from a die in tubular form, cooling the outer side of the extrudate by using a coolant while an aqueous solution of a liquid that is compatible with water and forms one-component is retained in the hollow portion of the extrudate, and inflating the solidified extrudate, wherein the liquid that is compatible with water and forms one-component has a concentration of 80 to 95% by mass in the aqueous solution, the process comprises controlling the liquid temperature at a depth of 200 mm from the liquid surface of the aqueous solution to 80° C. or less when the aqueous solution is retained in the hollow portion of the extrudate, and the wrap film has the liquid in applied state in amounts of 50 to 4,000 ppm.
9. The process for producing a wrap film made of a polyvinylidene chloride-based resin according to 8., wherein the wrap film has the liquid that is compatible with water and forms one-component in applied state in amounts of 50 to 3,000 ppm.
10. The process for producing a wrap film made of a polyvinylidene chloride-based resin according to 8. or 9., wherein the liquid that is compatible with water and forms one-component has a specific gravity of greater than 1.0 and 1.3 or less at 20° C.
11. The process for producing a wrap film made of a polyvinylidene chloride-based resin according to any of 8. to 10., wherein the liquid that is compatible with water and forms one-component has a boiling point of 150° C. or more.
12. The process for producing a wrap film made of a polyvinylidene chloride-based resin according to any of 8. to 11., wherein the liquid that is compatible with water and forms one-component is propylene glycol.
13. The process for producing a wrap film made of a polyvinylidene chloride-based resin according to any of 8. to 11., wherein the liquid that is compatible with water and forms one-component is one or more propylene glycol multimers selected from the group consisting of dipropylene glycol, tripropylene glycol, and polypropylene glycol having a weight-average molecular weight of 350 to 450.
14. The process for producing a wrap film made of a polyvinylidene chloride-based resin according to 13., wherein the propylene glycol multimer is dipropylene glycol.
15. The process for producing a wrap film made of a polyvinylidene chloride-based resin according to any of 8. to 14., wherein the relationship between the width W of a double-ply sheet obtained by collapsing the extrudate with a pinch roll after the cooling before the inflation and the difference in height, h, between the liquid surface h2 of the coolant filling the cold water bath and the liquid surface h1 of the aqueous solution retained in the hollow portion of the extrudate (h=h1−h2, h1≧h2), is controlled in the range of 0≦h/W (mm/mm)≦0.05.

EFFECT OF THE INVENTION

According to the present invention, a wrap film made of a polyvinylidene chloride-based having very stable physical properties resin can be obtained by maintaining the lubricating effect of the sock liquid as an opening agent, stabilizing the sock, and reducing parison width changes and meandering to eliminate parison wrinkles.

DESCRIPTION OF SYMBOLS

Figure 1:
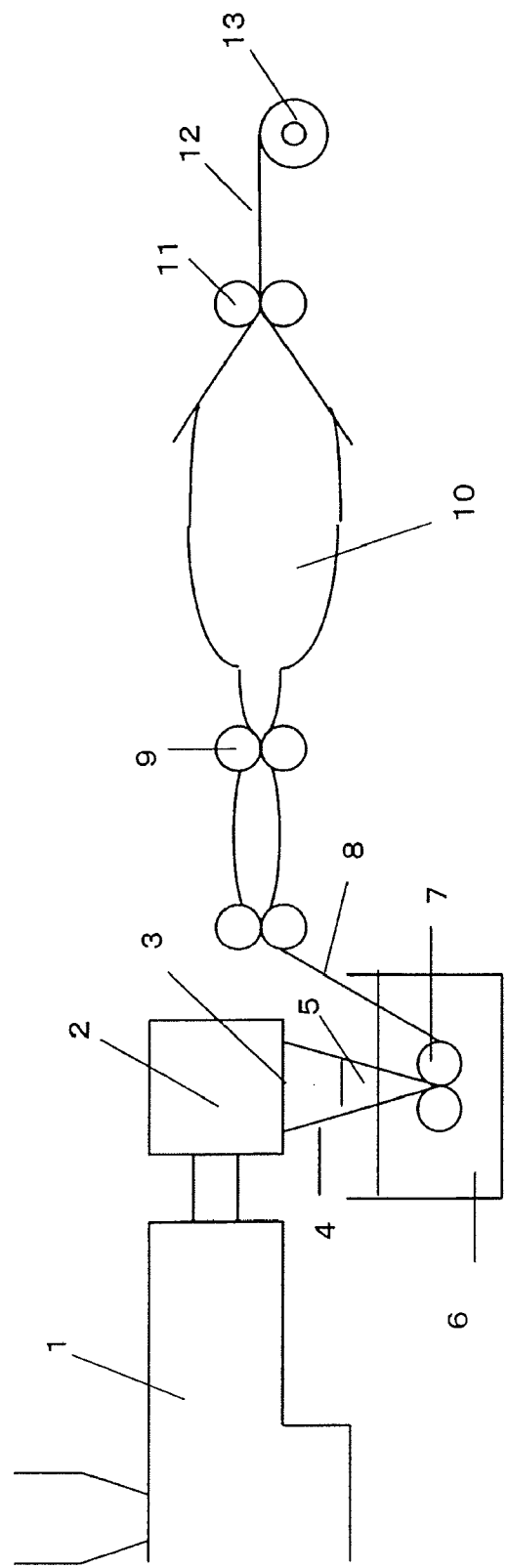
FIG. 1 is a schematic view of an apparatus used in the film formation process of the present invention.

1 Extruder
2 Die
3 Die opening
4 Tubular vinylidene chloride-based copolymer composition (sock)
5 Sock liquid
6 Cold water bath
7 First pinch roll
8 Parison
9 Second pinch roll
10 Bubble
11 Third pinch roll
12 Double-ply film
13 Wind-up roll

BEST MODE FOR CARRYING OUT THE INVENTION

The best mode for carrying out the present invention (hereinafter also referred to as the present Embodiment) will be described below in detail. Here, as used herein, vertical direction corresponds to perpendicular direction.

The wrap film made of a polyvinylidene chloride-based resin of the present Embodiment is a wrap film made of a polyvinylidene chloride-based resin prepared by melt-extruding a polyvinylidene chloride-based resin from the die in tubular form, cooling the outer side of the extrudate by using a coolant while an aqueous solution (sock liquid) of a liquid that is compatible with water and forms one-component is retained in the hollow portion of the extrudate (sock), and inflating the solidified extrudate (parison), wherein the liquid that is compatible with water and forms one-component has a concentration of 80 to 95% by mass in the aqueous solution and the wrap film has the liquid in applied state in amounts of 50 to 4,000 ppm. At the time, the resin is usually extruded from above downward and the sock moves downward. In addition, the sock is collapsed by the pinch roll to form a parison.

The greatest difference between the present invention and the conventional art is that the sock liquid is an aqueous solution of a liquid that is compatible with water and forms one-component and the sock liquid is applied to a film so that the amount of the applied liquid that is compatible with water and forms one-component contained in the sock liquid is 50 to 4,000 ppm. Here, the amount of the applied (provided) liquid that is compatible with water and forms one-component is the amount, expressed in mass ppm, of the applied liquid relative to the total amount of the applied liquid and the resin forming the film. The amount of this applied liquid is calculated by applying a liquid weighed out in advance to a film, extracting the liquid from the film, and weighing the extracted liquid. In inflation stretching where a film is produced via sock formation, it is the most important to stabilize the sock and obtain a parison without changes in width and meandering in order to reduce quality variations such as reduced yield (trim loss) due to film width changes and meandering in subsequent steps and nonuniform thickness. In addition, wrinkles occurring when the sock is collapsed by the pinch roll present a serious problem as a factor to reduced yield (blowout loss) in the stretching step.

As a known technique, in general, a technique that uses a mixed solution of a mineral oil and water as the sock liquid is widely known, but the two liquids are not compatible with each other, so the mixed solution is separated into two phases inside the sock. When the mixed solution is left to stand, the solution is stably separated into the oil phase on top of the water phase without any fluctuation. However, during real-world production, the resin extruded downward in tubular form is always continuously taken off by the pinch roll at a constant speed. At the time, the mineral oil is transported downward along the inner sock wall. When the mineral oil in oil phase transported to the bottom is squeezed by the pinch roll, the squeezed mineral oil returns to the upper portion of the sock because the oil has a lower specific gravity than water. For this reason, the mineral oil is stirred inside the sock. The vertical movement of the mineral oil at the time causes the sock to shake.

The present inventors have conducted extensive studies and found that instability factors such as parison width changes and meandering and wrinkles occurring when the sock is collapsed by the pinch roll are caused by the shaking of the sock liquid inside the sock. At the time, the inventors have successfully reduced the shaking inside the sock by forming a more uniform and stable sock liquid by using a liquid that forms one-component without moving vertically than by using a mixed solution of a mineral oil and water that allows the mineral oil in oil phase to move vertically by the action above.

Moreover, in the film formation process using inflation stretching, the parison is reheated and air is blown into the parison, and to reopen the parison obtained by collapsing the sock once, the sock liquid needs to be given the lubricating effect as an opening agent. In addition, even when the stretched double-ply film is separated into a single-ply film, the sock liquid needs to have the lubricating effect as an opening agent.

However, according to the conventional film formation techniques that use a liquid that is compatible with water and forms one-component as it is, the amount of the provided (applied) liquid to a film definitely cannot be controlled, causing poor opening of the parison or the whitening of the formed film. In contrast, the present invention controls the amount of an applied liquid that is compatible with water and forms one-component to a film. In the present invention, the liquid is applied in amounts of preferably 50 to 4,000 ppm, more preferably 50 to 3,000 ppm, and much more preferably 100 to 3,000 ppm. The most preferable range is 200 to 1,000 ppm in the case of a liquid that is compatible with water and forms one-component being propylene glycol, and 500 to 3,000 ppm in the case of the liquid being dipropylene glycol, tripropylene glycol, or polypropylene glycol having an average molecular weight of about 400. If the sock liquid is applied to the sock in amounts in that range, the sock liquid exhibits the lubricating effect appropriate as an opening agent.

Here, polypropylene glycol having an average molecular weight of about 400 refers to polypropylene glycol having a weight-average molecular weight of 350 to 400. This weight-average molecular weight is usually measured by gel permeation chromatography (GPC).

If the amount of an applied liquid that is compatible with water and forms one-component is below 50 ppm, the parison and the stretched film have poor opening properties resulting in lack of stable stretch propagation followed by a blowout, or the stretched double-ply film has very poor opening properties resulting in a great difficulty of handling during slitting. If the amount of the applied liquid is greater than 4,000 ppm, the film has good slitting properties and rewinding properties, but a large amount of the liquid applied is left on the wrap film surface, inhibiting the adhesion that is the most important physical properties as a wrap film, and the left liquid reduces the clarity of the film.

To easily control the amount of an applied liquid that is compatible with water and forms one-component within the above range, the liquid that is compatible with water and forms one-component in the sock liquid has a concentration of preferably 80 to 95% by mass and more preferably 85 to 95% by mass.

In addition, if the sock has appropriate tension in the lower portion thereof, the sock shape becomes stable and thus parison width change and meandering can be further reduced. For example, the outer side of the sock is preferably cooled with a coolant by passing the sock through a storage tank (cold water bath) that stores the coolant. If a liquid whose specific gravity is opposite to the preferred aspect of the present Embodiment compared with a coolant used in the cold water bath, in other words, a liquid having a low specific gravity is used as the whole sock liquid, as in the combination of water as the coolant used in the cold water bath and a mineral oil as the sock liquid, then the sock shape tends to become unstable, for example, because the sock is crushed by the pressure exerted by the coolant used in the cold water bath and pulsates. On top of that, the crushing of the sock causes parison wrinkles in the pinch roll portion, easily inducing a blowout factor. For this reason, bringing the specific gravity of the coolant used in the cold water bath and the specific gravity of the sock liquid close to each other can make the sock have appropriate tension in the lower portion thereof and can reduce the difference in water level between the inside and the outside of the sock.

To stabilize the sock shape by making the sock have tension in the lower portion thereof, the liquid that is compatible with water and forms one-component contained in the sock liquid preferably has a specific gravity greater than 1.0 at 20° C. with respect to the specific gravity of 1.0 that water has at 20° C., in view of the tension of the sock itself as well. Here, the specific gravity of water at 20° C. is used as the reference because water is commonly used as the coolant used in the cold water bath. In addition, a too greater difference in specific gravity between the liquid and the sock coolant causes a "sag" in the lower portion of the sock under its weight, so the liquid that is compatible with water and forms one-component preferably has a specific gravity of 1.3 or less at 20° C. with respect to the specific gravity of the coolant.

In general, water is very often used as the coolant used in the cold water bath. In view of reducing the difference in water level between the outside and the inside of the sock to inhibit unnecessary draw orientation and the like that reduce the stretch properties, the difference in specific gravity at 20° C. between the coolant used in the cold water bath and a liquid that is compatible with water and forms one-component is preferably 0.3 or less. For a sock liquid that uses, for example, propylene glycol, an aqueous cellulose solution, or an aqueous polyvinyl alcohol solution, the material used in the coolant is not particularly limited as long as the difference in specific gravity at 20° C. between the coolant and a liquid that is compatible with water and forms one-component is 0.3 or less. However, water is the most preferable in terms of control of the application amount that has the greatest effect on the physical properties, safety, cost, and the like.

As a sock liquid, cellulose-based and polyvinyl alcohol-based aqueous solutions are widely known. However, if these are used, sometimes parison-cooling cannot keep pace in a production facility having a high output rate. At the time, the sock liquid comes into contact with the upper portion of the sock (molten parison) and has the highest temperature, so at the upper portion of the sock, the sock liquid temperature can exceed 100° C. In this case, the sock liquid boils because it is a cellulose-based or polyvinyl alcohol-based aqueous solution. If the sock liquid boils in a susceptive area in the upper portion that has not yet been cooled or solidified sufficiently, the sock is affected by the boiling and loses its stability, naturally causing instability factors such as parison width changes and meandering. In addition, the sock liquid boils rapidly because the liquid temperature exceeds 100° C., so the state of the sock that has been stable until then will be lost instantly. In some cases, it is assumed that the sock itself will be destroyed. When a wrap film made of a polyvinylidene chloride-based resin is formed, the upper portion of the sock that comes into contact with the sock liquid depending on extrusion situations can have a temperature greater than 100° C. because the resin temperature during extrusion is set at 180 to 190° C. For this reason, the liquid that is compatible with water and forms one-contained in the sock liquid preferably has a boiling point of 150° C. or more.

Here, examples of an indicator of the stability of the sock include occurrence frequency of parison wrinkles. For example, if an aqueous solution of 90% by mass of a propylene glycol that is a liquid that is compatible with water and forms one-component is used as the sock liquid, then the sock is very stable, causing no parison wrinkles even when wrap films are produced for 1 month under specified conditions. In contrast, if a mixed solution of 90% by mass of a propylene glycol and 10% by mass of a mineral oil is used as the sock liquid, the mineral oil moves vertically, causing parison wrinkles to occur at a frequency of about 1 event/month when wrap films are produced for 1 month under the specified conditions. Moreover, for a mixed solution of 80% by mass of water and 20% by mass of a mineral oil, parison wrinkles occur at a frequency of about 1 event/10 days when wrap films are produced for 1 month under the specified conditions.

Because propylene glycol has a wide range of conditions that satisfy good opening properties and adhesion of the parison and the film, the liquid that is compatible with water and forms one-component satisfying all of these conditions is most preferably propylene glycol.

In addition, to obtain a higher clarity, the liquid satisfying all of these conditions is preferably one or more propylene glycol multimers selected from the group consisting of dipropylene glycol, tripropylene glycol, and polypropylene glycol having an average molecular weight of about 400. Dipropylene glycol is the most preferable of these propylene glycol multimers in terms of long-term stable opening of the parison as well as film adhesion, cost, and stable supply.

In addition, to easily control the amount of an applied liquid that is compatible with water and forms one-component within the range mentioned earlier as well as the opening properties and adhesion above, the sock liquid is preferably an aqueous solution of propylene glycol, and the propylene glycol in the aqueous solution has a concentration of more preferably 80 to 95% by mass and much more preferably 85 to 95% by mass.

Moreover, to obtain a higher clarity and easily control the amount of the applied liquid within the range mentioned earlier as well as the opening properties and adhesion above, the sock liquid is preferably an aqueous solution of one or more propylene glycol multimers selected from the group consisting of dipropylene glycol, tripropylene glycol, and polypropylene glycol having an average molecular weight of about 400, and the propylene glycol multimers in the aqueous solution has a concentration of more preferably 80 to 95% by mass and much more preferably 85 to 95% by mass. And, an aqueous solution of dipropylene glycol is the most preferable of aqueous solutions of these propylene glycol multimers in terms of long-term stable opening of the parison as well as film adhesion, cost, and stable supply.

The sock liquid may contain an inorganic powder, but in view of ensuring film clarity and satisfying the physical properties that a wrap film need to have, an inorganic powder content of 0% by mass, in other words, containing no inorganic powder other than inevitable impurities is the most preferable.

Setting the temperature of the sock liquid also varies depending on cold water bath temperature, output rate, and parison take-off speed, and ultimately sock liquid temperature is determined by these factors based on the heat balance for parison cooling. In most cases, the temperature inside the sock varies significantly depending on changes in production conditions. The temperature of the sock liquid should be controlled by the interface temperature (liquid surface temperature) of the sock liquid that has the greatest effect on the stability of the sock such as the boiling of the sock liquid. However, to reduce measurement variations and errors, the temperature at a location about 200 mm from the liquid surface where a measurement instrument can measure temperature stably, in other words, the liquid temperature at a depth of 200 mm from the surface of the sock liquid should be measured for control. Moreover, the opening properties of the parison should be controlled by the temperature immediately before the pinch roll (a first pinch roll 7 in FIG. 1 described later) that has the greatest effect on the amount of a provided liquid that is compatible with water and forms one-component. However, to reduce measurement variations and errors similarly, for practical purposes, the temperature at a location about 200 mm from the liquid surface, in other words, the liquid temperature at a depth of 200 mm from the surface of the sock liquid can be used instead.

If the liquid temperature at this depth exceeds 80° C., the sock becomes unstable and the amount of the provided liquid that is compatible with water and forms one-component cannot be controlled, causing the frequent occurrence of poor parison opening and thereby making it difficult to produce wrap films practically. For this reason, it is important to control the temperature of the sock liquid at a depth of 200 mm from the liquid surface preferably to 80° C. or less, more preferably to 70° C. or less, and most preferably to 60° C. or less.

The cold water bath temperature needs also to be controlled because it greatly affects the sock liquid temperature and the amount of the provided liquid that is compatible with water and forms one-component. The molten resin composition is extruded in tubular form through the die opening of a die, and the outer side of the extrudate is cooled to be solidified in a cold water bath. At the time, sufficient cooling prevents excess crystallization and provides easy subsequent stretching. In contrast, too much cooling causes excess parison solidification, easily making it difficult to control the provision of the liquid. For these reasons, cold water bath temperature is preferably in the range of 0° C. or more to less than 35° C. in terms of preventing parison crystallization and balancing crystallization with the cooling-solidification. In addition, insufficient cooling-solidification of the parison causes the parison to curl, making it easy for its side edges to be rolled inward. To prevent the curling of the parison, cold water bath temperature is further preferably in the range of 0° C. or more to less than 20° C.

An effective way of stabilizing the sock shape is to shorten the distance (hot distance) from the die opening to the liquid surface of the cold water bath (water surface if the coolant is water). When the difference in height between the liquid surface h2 of the coolant used in the cold water bath (i.e., the distance from the bottom of the cold water bath to the liquid surface of the solvent; the same shall apply hereinafter) and the liquid surface h1 of the sock liquid retained in the hollow portion of the extrudate (sock) (i.e., the distance from the bottom of the cold water bath to the liquid surface; the same shall apply hereinafter) is h (h=h1−h2; h1≧h2), the ratio of the h to the width W of the double-ply sheet (parison) obtained by using a pinch roll to collapse the tubular extrudate extruded from the die in melt form before inflation stretching (hereinafter also referred to as parison width W), h/W (mm/mm), is most preferably zero (0). However, it is practically difficult to always maintain a ratio of zero because of output rate, sock take-off speed, and the like, so it is important to bring the ratio as close to zero as possible. If h/W (mm/mm) is less than 0, the upper portion of the sock that does not surround the sock liquid is deformed by the water pressure exerted by the external coolant, destabilizing the sock. If h/W (mm/mm) is greater than 0.05, the difference h in liquid surface height between the cold water bath and the inside of the sock becomes too large, destabilizing the sock. For these reasons, the sock can be stabilized by controlling the relationship between the parison width W and the difference h in liquid surface height between the cold water bath and the inside of the sock in the range of preferably 0≦h/W (mm/mm)≦0.05, more preferably 0≦h/W (mm/mm)≦0.03. In addition, this control also can shorten the hot distance, bring forward the time at which molten resin is cooled for higher efficiency, and prevent unnecessary draw orientation and the like that reduce stretching properties. Moreover, h1>h2 is preferable to ensure that h/W (mm/mm) is controlled in the range above.

An example of the process for producing a wrap film made of a polyvinylidene chloride-based resin according to the present invention will be described below.

Figure 2:
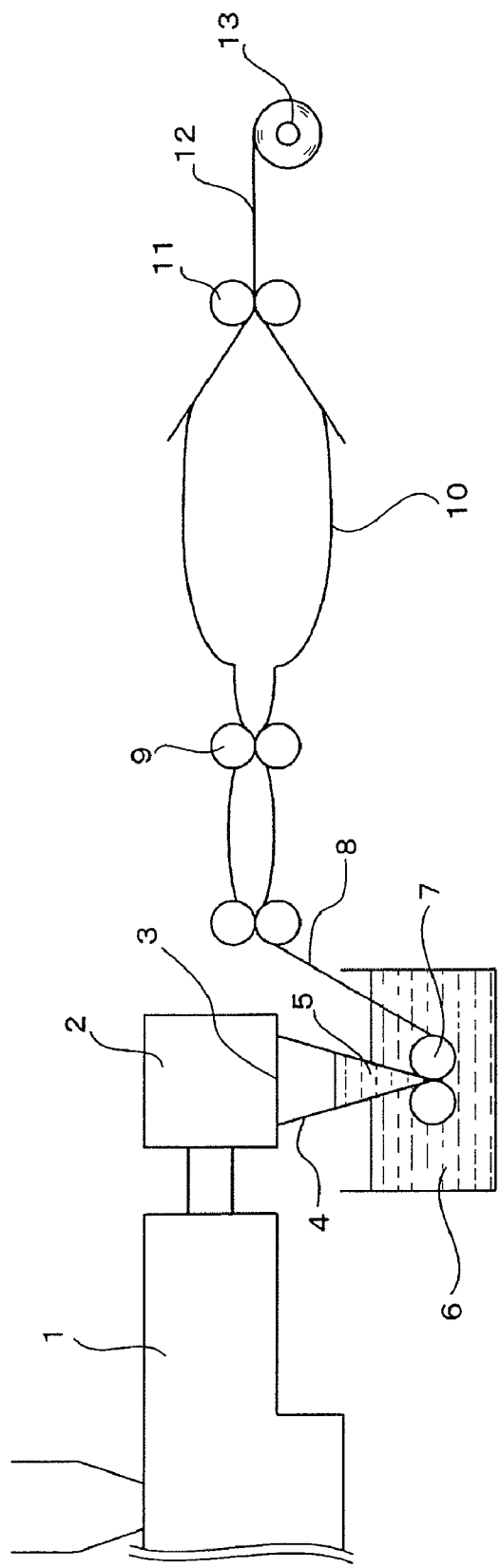
FIG. 2 is another schematic view of an apparatus used in the film formation process of the present invention.

FIGS. 1 and 2 are schematic views of a production apparatus illustrating an example of the process for producing a wrap film.

The process for producing a wrap film according to the present Embodiment comprises the steps of extruding a polyvinylidene chloride-based resin from a die in tubular form in the molten state (extrusion step), making a sock liquid present (retained) in the hollow portion of the resin extruded in tubular form or the extrudate and cooling the outer side of the extrudate with water to solidify the extrudate (cooling-solidification step), and subjecting the solidified extrudate to inflation stretching (inflation step). In this production process, preferably, the sock liquid present in the hollow portion is a mixture (aqueous solution) of water and one or more propylene glycol multimers selected from the group consisting of propylene glycol, dipropylene glycol, tripropylene glycol, and polypropylene glycol having a weight-average molecular weight of 350 to 400, the propylene glycol multimers in the aqueous solution have a concentration of 80 to 95% by mass, and the liquid temperature at a depth of 200 mm from the liquid surface of the sock liquid present in the hollow portion is controlled to 80° C. or less. This process for producing a wrap film will be described below by referring to drawings.

First, in the extrusion step, the molten vinylidene chloride-based copolymer composition is extruded by an extruder (1) through a die opening (3) of a die (2) in tubular form to form a sock (4). Next, in the cooling-solidification step, the outer side of the sock (4) that is the extrudate is brought into contact with cold water in a cold water bath (6) and a sock liquid (5) is injected into and retained in the inside of the sock (4) in a conventional manner to cool the sock (4) from inside and outside for solidification. At the time, the liquid surface height of the sock liquid (5) from the portion at which the sock (4) is collapsed by a first pinch roll (7) is usually greater than 200 mm. In addition, the sock liquid (5) is applied to the inner side of the sock (4). The solidified sock (4) is collapsed by the first pinch roll (7) to form a parison (8) that is a double-ply sheet.

Next, air is blown into the inner side of the parison (8) to reopen the parison (8) in tubular form. At the time, the sock liquid (5) applied to the inner surface (inner side) of the sock (4) develops the effect as an opening agent for the parison (8). The parison (8) is reheated to a temperature appropriate for stretching by hot water (not shown). The hot water deposited on the outer side of the parison (8) is squeezed off by a second pinch roll (9). Next, in the inflation step, air is blown into the tubular parison (8) heated to the appropriate temperature to form a bubble (10) by inflation stretching to obtain a stretched film. Then, the stretched film is collapsed by a third pinch roll (11) into a double-ply film (12). The double-ply film (12) is wound up by a wind-up roll (13). Furthermore, this double-ply film is slit to separate into a single-ply film. Finally, this single-ply film is wound on a paper tube to obtain a wrap film wound on the paper tube.

Here, the sock liquid (5) of the present invention containing a liquid that is compatible with water and forms one-component is applied by bringing the sock liquid into contact with the inner surface of the sock with the sock liquid retained in the hollow portion of the extrudate melt-extruded in tubular form from the die.

The polyvinylidene chloride-based resin used in the present invention contains 85 to 97% by weight of vinylidene chloride units. In addition to vinylidene chloride, one or two or more monomers copolymerizable with vinylidene chloride including acrylates such as vinyl chloride, methyl acrylate, and butyl acrylate, methacrylates such as methyl methacrylate and butyl methacrylate, acrylonitrile, or vinyl acetate may be copolymerized. In the above example of the process for producing a wrap film, a vinylidene chloride-based copolymer composition is used, but a homopolymer composition of a vinylidene chloride-based resin may be used.

The thickness of the wrap film of the present invention is not particularly limited and is generally 5 to 20 μm. In addition, an extruder that is usually used for wrap film formation has an output rate of 100 to 600 kg/hr.

The film of the present invention is obtained, for example, by uniformly mixing a polyvinylidene chloride-based resin and various additives with a ribbon blender, a Henschel mixer, or the like as needed to obtain a resin composition, aging the resin composition for 24 hours, and then melt-extruding the resin composition and subjecting the extrudate to inflation stretching. A plasticizer, a stabilizer, a weather resistance improver, a colorant such as a dye or a pigment, an anti-fogging agent, an antimicrobial, a lubricant, a nucleating agent, an oligomer such as polyester, a polymer such as MBS, and the like that are used in known food packaging materials can also be added to the resin in amounts that do not reduce the advantages of the present invention. These may be added at any step to film formation. The wrap film obtained by the process above has good adhesion immediately after production, stable adhesion having small seasonal differences between summer and winter, and conflicting properties between high adhesion and excellent unrolling properties made compatible with each other and improved. In addition, the wrap film obtained by the process above has very stable physical properties because the sock liquid helps maintain the lubricating effect as an opening agent and at the same time stabilize the sock and reduce parison width changes and meandering to eliminate parison wrinkles.

As mentioned above, the best mode for carrying out the present invention was described, but the present invention is not limited thereto and can be varied in different ways as long as the variations do not deviate from the gist of the invention. In addition, the wrap film made of a polyvinylidene chloride-based resin and the process for producing the wrap film according to the present invention may also have various constitutions, conditions, and the like that are different from those mentioned above and similar to those known.

EXAMPLES

The present invention will be described specifically below by using Examples and Comparative Examples, but the present invention is not limited thereto.

The evaluation methods used in the Examples and Comparative Examples are as follows:
(Evaluation Method)
(1-1. Measurement of the Amount of a Provided (Applied) Liquid that is compatible with Water and Forms One-component to a Film)

A sample (stretched film wound with the wind-up roll (13)) to which a sock liquid was provided was collected and cut fine, and about 2 g of the cut sample was weighed out. The weighed sample was placed in an Erlenmeyer flask with a stopper, to which 20 mL of methanol measured out precisely was added by using a whole pipette and the flask was stoppered for thermal extraction in a water bath at 60° C. for 1 hour. The resulting extract was subjected to gas chromatography to determine the mass of the liquid that is compatible with water and forms one-component. The resulting mass values of the sample and the liquid were used to calculate the amount of the applied liquid as parts per million by mass (ppm). However, in Comparative Examples 2 and 7, the required amount of stretched film could not be collected after winding up by the wind-up roll (13), the parison (8) immediately after leaving the second pinch roll (9) was collected as a sample.
(1-2. Measurement of the Amount of a Provided (Applied) Mineral Oil; Comparative Examples 3 to 5)

A sample (stretched film wound with the wind-up roll (13)) to which a mineral oil was provided was collected, and about 3 g thereof was weighed out, placed in a beaker, and dissolved in 30 cm$^3$ of tetrahydrofuran to obtain a solution. To this solution 150 cm$^3$ of n-hexane was dropped in small amounts at a time under stirring with a stirrer to precipitate the polyvinylidene chloride resin, and the solution containing this precipitate was filtered with a glass filter. The resulting filtrate was evaporated to dryness with an evaporator at 50° C. and 40 kPa, diluted to 5 cm$^3$ with n-hexane, and passed through a membrane filter having a pore size of 0.5 μm made of polytetrafluoroethylene. The solution passed through the filter was subjected to liquid chromatography to determine the mass of the mineral oil. The resulting mass values of the sample and the mineral oil sock liquid were used to calculate the amount of the applied mineral oil sock liquid in parts per million by mass (ppm).
(2. Sock Stability)

The stability of the sock was visually evaluated.

| Evaluating symbol | Evaluating |
|---|---|
| ⊚ | The sock is very stable and has no parison width changes or meandering. |

-continued

| Evaluating symbol | Evaluating |
|---|---|
| ○ | The sock is stable and has almost no parison width changes or meandering. |
| Δ | The sock is slightly unstable and has slight parison width changes and meandering. |
| X | The sock is very stable and provides no stable parison. |

(3. The Presence or Absence of Parison Wrinkles)

The resulting parison was evaluated for the presence or absence of weaving wrinkles (parison wrinkles) with the first pinch roll.

| Evaluating symbol | Evaluating |
|---|---|
| ○ | The parison has no weaving wrinkles and the film has good continuous stretching properties. |
| Δ | The parison has slight weaving wrinkles and can be continuously stretched. |
| X | The parison is poor because of significant weaving wrinkles and cannot be stably stretched. |

(4. Frequency of Parison Wrinkles)

The frequency of the parison wrinkles during continuous production was evaluated.

| Evaluating symbol | Evaluating |
|---|---|
| ○ | The parison has no weaving wrinkles for 1 month. |
| Δ | The parison has weaving wrinkles at a frequency of about 1 event/month. |
| X | The parison has weaving wrinkles at a frequency of about 1 events/10 days. |

(5. Parison Opening Properties)

The opening properties of the resulting parison were evaluated in view of stretch propagation.

| Evaluating symbol | Evaluating |
|---|---|
| ○ | The parison is sufficiently open at a location just (immediately) after leaving the second pinch roll. |
| Δ | The parison has an end that does not open perfectly at a location just (immediately) after leaving the second pinch roll and has a fused portion. |
| X | The parison is always fused at and beyond a location just (immediately) after leaving the second pinch roll, and does not open. |

(6. Frequency of Poor Parison Opening)

The frequency of poor opening of the parison is evaluated.

| Evaluating symbol | Evaluating |
|---|---|
| ⊚ | No poor opening of the parison occurs. |
| ○ | Poor opening of the parison occurs at a frequency of about 1 event/month. |
| Δ | Poor opening of the parison occurs at a frequency of about 1 event/10 days. |

| Evaluating symbol | Evaluating |
|---|---|
| X | The parison is always fused immediately after sock formation, and does not open. |

(7. Film Opening Properties)

The opening properties of the resulting stretched double-ply film were evaluated based on the ease of handling during separating the double-ply film into single-ply films (single separation).

| Evaluating symbol | Evaluating |
|---|---|
| ○ | The finger passes very smoothly between single-ply films. |
| Δ | The finger passes slightly unsmoothly between single-ply films. |
| X | The opening properties between single-ply films are poor and the finger does not pass between the films. |

(8. Adhesion)

First, two aluminum cylindrical jigs having a base area of 25 cm$^2$, a height of 55 mm, and weight of 400 g were prepared, and on the base of each jig a filter paper having the same shape as the shape of the base was placed. The filter papers on the bases of both jigs were covered with the wrap films stored at 28° C. for 1 month with preventing the wrap films from wrinkles, which was then bound and fixed with a rubber band. The two jigs covered with the wrap film were aligned with each other so that the surfaces of the bases covered with the wrap films fit together perfectly with face to face, and pressed under a load of 500 g for 1 minute. Next, the amount of work (adhesion workload) required to separate the wrap films covering surfaces of the bases by pulling each of the jigs in a direction perpendicular to the surfaces at a rate of 5 mm/min with a tensile/compression testing machine was measured (in mJ/25 cm$^2$). Here, this measurement was conducted in an atmosphere at 23° C. and 50% RH.

The adhesion of the wrap film was evaluated based on the adhesion workload measured on the following four-grade scale.

<Adhesion Workload After Storage at 28° C. for 1 Month>

| Evaluating symbol | Amount of workload (mJ/25 cm$^2$) | Evaluating |
|---|---|---|
| ⊚ | 2.0 or more and less than 2.5 | The wrap film has a balanced, sufficient adhesion that is at an excellent level. |
| ○ | 1.5 or more and less than 2.0 | The wrap film has an adhesion that is at a practical level. |
| Δ | 1.0 or more and less than 1.5 | The wrap film has a slight adhesion that presents a practical problem. |
|  | 2.5 or more and less than 3.2 | The wrap film has a too high adhesion and difficult to handle. |
| X | Less than 1.0 | The wrap film has a too low adhesion and is impractical. |
|  | 3.2 or more | The wrap film has a too high adhesion and is extremely difficult to handle. |

(9. Transparency Haze)

The resulting wrap film was unwound, and the degree of cloudiness (haze (%)) thereof was measured in the sheet state according to ASTM-D-1003.

| Evaluating symbol | Measured haze (%) | Evaluating |
|---|---|---|
| ○ | Less than 0.3 | Excellent transparency. |
| Δ | 0.3 or more and less than 1.0 | Transparency at a practical level. |
| X | 1.0 or more | Poor transparency. |

(10. Transparency The Presence of Droplets)

At the moment that the resulting wrap film was unwound, the sock liquid applied to the film surface was visually evaluated for the presence of droplets.

| Rating symbol | Rating |
|---|---|
| ◎ | At the moment that the wrap film is unwound, the sock liquid uniformly wets and spreads over the film surface and no droplets are present. |
| ○ | At the moment that the wrap film is unwound, a few droplets are present but become transparent, presenting no practical problem. |
| Δ | At the moment that the wrap film is unwound, slightly many droplets are present, reducing transparency slightly. |
| X | Many droplets are present, reducing transparency. |

(11. Overall Evaluation)

Based on the evaluation results above, an overall evaluation was made.

Example 1

A production apparatus similar to that illustrated schematically in FIG. 2 was used (the same shall apply hereinafter). First, a polyvinylidene chloride-based resin composition prepared by mixing together a polyvinylidene chloride-based resin (vinylidene chloride component, 90% by mass; vinyl chloride component, 10% by mass) having a weight-average molecular weight of 9 million, acetyl tributyl citrate (hereinafter referred to as ATBC), and epoxidized soybean oil (hereinafter referred to as ESO) at a ratio of 93.0% by mass to 5.5% by mass to 1.5% by mass, respectively was extruded through a die opening (3) of a die (2) in tubular form at an extrusion rate of 300 kg/hr with an extruder (1). The extrudate was rapidly cooled to be solidified with water at 10° C. in a cold water bath (6). At the time, a 90% by mass aqueous solution of a propylene glycol having a specific gravity of 1.036 (food additive propylene glycol, Mitsui Takeda Chemicals, Inc.) (abbreviated to PG in Table 1) was poured into the inside of a formed sock (4) to prepare a sock liquid (5). The h/W value (i.e., difference [mm] in height between the distance from the bottom of the cold water bath to the liquid surface of the coolant (water) and the distance from the bottom to the liquid surface of the sock liquid/double-ply sheet width [mm]) at the time was 0.02. The propylene glycol was applied in amounts of 1,500 ppm to the inner surface of the sock (4) by setting the take-off speed of the parison (8) at 20 m/min and the cylinder gauge pressure of a pinch roll (7) under the sock (4) at 0.45 MPa. Measurement shows that the temperature of the sock liquid (5) at a depth of about 200 mm from the liquid surface at the time was 55° C. In addition, the parison (8) at the time had no curling and no wrinkles. The parison (8) had poor opening only at a frequency of about 1 event/month. Moreover, the parison was heated with hot water at 45° C. and then stretched by inflation into a tubular film (a bubble (10)). The tubular film was pinched and collapsed flat by a pinch roll (11) and a two-ply film (12) having a lay-flat width of 1,900 mm and a thickness of 10 μm was wound at a winding speed of 100 m/min with a wind-up roll (13) to obtain a stretched film. The results based on the evaluation methods above are shown in Table 1.

Example 2

Operations were conducted in the same way as in Example 1, except that a polyvinylidene chloride-based resin composition extruded in tubular form was rapidly cooled to be solidified with water at 23° C. in the cold water bath (6). The cylinder gauge pressure of the pinch roll (7) under the sock (4) was set at 0.45 MPa to apply a 90% by mass aqueous solution of a propylene glycol (food additive propylene glycol, Mitsui Takeda Chemicals, Inc.) that was the sock liquid (5) to the inner surface of the sock (4) so that the amount of propylene glycol applied was 800 ppm. The h/W value at the time was 0.02. Measurement showed that the temperature of the sock liquid (5) at a depth of about 200 mm from the liquid surface at the time was 60° C. because of the difference between the sock liquid temperature and the coolant temperature. In addition, parison (8) at the time had almost no curling and no wrinkles. The parison (8) had poor opening at a frequency of about 1 event/month. A stretched film was obtained in the same way as in Example 1 except for the condition mentioned above. The results based on the evaluation methods above are shown in Table 1.

Example 3

Operations were conducted in the same way as in Example 1, except for the use of a 90% by mass aqueous solution of a dipropylene glycol of a specific gravity of 1.022 (Asahi Glass Co., Ltd.) (abbreviated to DPG in Table 1) as the sock liquid (5). The cylinder gauge pressure of the pinch roll (7) under the sock (4) was set at 0.45 MPa to apply the sock liquid (5) to the inner surface of the sock (4) so that the amount of dipropylene glycol applied was 2,000 ppm. The h/W value at the time was 0.02. Measurement showed that the temperature of the sock liquid (5) at a depth of about 200 mm from the liquid surface at the time was 55° C. In addition, the parison (8) at the time had no curling and no wrinkles. The parison (8) also had no poor opening. A stretched film was obtained in the same way as in Example 1 except for the condition mentioned above. The results based on the evaluation methods above are shown in Table 1.

Example 4

Operations were conducted in the same way as in Example 2, except for the use of a 90% by mass aqueous solution of a dipropylene glycol having a specific gravity of 1.022 (Asahi Glass Co., Ltd.) (abbreviated to DPG in Table 1) as the sock liquid (5). The cylinder gauge pressure of the pinch roll (7) under the sock (4) was set at 0.45 MPa to apply the sock liquid (5) to the inner surface of the sock (4) so that the amount of dipropylene glycol applied was 1,200 ppm. The h/W value at the time was 0.02. Measurement showed that the temperature of the sock liquid (5) at a depth of about 200 mm from the liquid surface at the time was 60° C. In addition, the parison (8) at the time had almost no curling and no wrinkles. The parison (8) had no poor opening. A stretched film was obtained in the same way as in Example 2 except for the condition mentioned above. The results based on the evaluation methods above are shown in Table 1.

Example 5

Operations were conducted in the same way as in Example 1, except for the use of a 90% by mass aqueous solution of a tripropylene glycol having a specific gravity of 1.019 (Asahi Glass Co., Ltd.) (abbreviated to TPG in Table 1) as the sock liquid (5). The cylinder gauge pressure of the pinch roll (7) under the sock (4) was set at 0.45 MPa to apply the sock liquid (5) to the inner surface of the sock (4) so that the amount of tripropylene glycol applied was 2,500 ppm. The h/W value at the time was 0.02. Measurement showed that the temperature of the sock liquid (5) at a depth of about 200 mm from the liquid surface at the time was 55° C. In addition, the parison (8) at the time had no curling and no wrinkles. The parison (8) had no poor opening. A stretched film was obtained in the same way as in Example 1 except for the condition mentioned above. The results based on the evaluation methods above are shown in Table 1.

Example 6

Operations were conducted in the same way as in Example 2, except for the use of a 90% aqueous solution of a tripropylene glycol having a specific gravity of 1.019 (Asahi Glass Co., Ltd.) (abbreviated to TPG in Table 1) as the sock liquid (5). The cylinder gauge pressure of the pinch roll (7) under the sock (4) was set at 0.45 MPa to apply the sock liquid (5) to the inner surface of the sock (4) so that the amount of tripropylene glycol applied was 1,500 ppm. The h/W value at the time was 0.02. Measurement showed that the temperature of the sock liquid (5) at a depth of about 200 mm from the liquid surface at the time was 60° C. In addition, the parison (8) at the time had almost no curling and no wrinkles. The parison (8) had no poor opening. A stretched film was obtained in the same way as in Example 2 except for the condition mentioned above. The results based on the evaluation methods above are shown in Table 1.

Example 7

Operations were conducted in the same way as in Example 1, except for the use of a 90% by mass aqueous solution of a polypropylene glycol #400 having a specific gravity of 1.007 (Asahi Glass Co., Ltd.) (abbreviated to PPG#400 in Table 1; weight-average molecular weight, about 400) as the sock liquid (5). The cylinder gauge pressure of the pinch roll (7) under the sock (4) was set at 0.45 MPa to apply the sock liquid (5) to the inner surface of the sock (4) so that the amount of polypropylene glycol applied was 3,000 ppm. The h/W value at the time was 0.02. Measurement showed that the temperature of the sock liquid (5) at a depth of about 200 mm from the liquid surface at the time was 55° C. In addition, the parison (8) at the time had no curling and no wrinkles. The parison (8) had no poor opening. A stretched film was obtained in the same way as in Example 1 except for the condition mentioned above. The results based on the evaluation methods above are shown in Table 1.

Example 8

Operations were conducted in the same way as in Example 2, except for the use of a 90% by mass aqueous solution of a polypropylene glycol #400 having a specific gravity of 1.007 (Asahi Glass Co., Ltd.) (abbreviated to PPG#400 in Table 1; weight-average molecular weight, about 400) as the sock liquid (5). The cylinder gauge pressure of the pinch roll (7) under the sock (4) was set at 0.45 MPa to apply the sock liquid (5) to the inner surface of the sock (4) so that the amount of polypropylene glycol applied was 1,800 ppm. The h/W value at the time was 0.02. Measurement showed that the temperature of the sock liquid (5) at a depth of about 200 mm from the liquid surface at the time was 60° C. In addition, the parison (8) at the time had almost no curling and no wrinkles. The parison (8) had no poor opening. A stretched film was obtained in the same way as in Example 2 except for the condition mentioned above. The results based on the evaluation methods above are shown in Table 1.

Comparative Example 1

A 90% by mass aqueous solution of a propylene glycol having a specific gravity of 1.036 (food additive propylene glycol, Mitsui Takeda Chemicals, Inc.) was used as the sock liquid (5), and the cylinder gauge pressure of the pinch roll (7) under the sock (4) was set at 0.08 MPa to apply the sock liquid (5) to the inner surface of the sock (4) so that the amount of polypropylene glycol applied was 5,000 ppm. The h/W value at the time was 0.02. Measurement showed that the temperature of the sock liquid (5) at a depth of about 200 mm from the liquid surface at the time was 55° C. In addition, the parison (8) at the time had no curling and no wrinkles. The parison (8) also had no poor opening. A stretched film was obtained in the same way as in Example 1 except for the condition mentioned above. The results based on the evaluation methods above are shown in Table 1.

Comparative Example 2

Operations were conducted in the same way as in Example 1, except that a 90% by mass aqueous solution of a propylene glycol having a specific gravity of 1.036 (food additive propylene glycol, Mitsui Takeda Chemicals, Inc.) was used as the sock liquid (5) and the sock liquid (5) was applied to the inner surface of the sock (4) so that the amount of propylene glycol applied was 20 ppm by setting the cylinder gauge pressure of the pinch roll (7) under the sock (4) at 0.8 MPa. The h/W value at the time was 0.02. Measurement showed that the temperature of the sock liquid (5) at a depth of about 200 mm from the liquid surface at the time was 55° C. In addition, the parison (8) had no curling and no wrinkles. However, the parison opening properties were poor, stretch propagation did not proceed, and blowouts occurred very often, failing to obtain a film stably and proceed to subsequent steps. The results based on the evaluation methods above are shown in Table 1.

Comparative Example 3

Operations were conducted in the same way as in Example 1, except for the use of a mixed solution of 90% by mass of a propylene glycol having a specific gravity of 1.036 (food additive propylene glycol, Mitsui Takeda Chemicals, Inc.) and 10% by mass of a mineral oil having a specific gravity of 0.845 (Moresco White P-70S, Matsumura Oil Research Corp.) (abbreviated to P70S in Table 1) as the sock liquid (5). In this case, at first, the mineral oil was applied to the parison sufficiently, and the propylene glycol was repelled by the mineral oil, so the amount of propylene glycol applied was below the limit of measurement. In addition, the h/W value at the time was 0.02. Measurement showed that the temperature of the sock liquid (5) at a depth of about 200 mm from the liquid surface at the time was 55° C. In addition, the parison (8) at the time had no curling and had wrinkles at a frequency of about 1 event/month. A stretched film was obtained in the same way as in Example 1 except for the condition mentioned above. The results based on the evaluation methods above are shown in Table 1.

Comparative Example 4

Operations were conducted in the same way as in Example 1, except for the use of a mixed solution of 20% by mass of a mineral oil having a specific gravity of 0.845 (Moresco White P-70S, Matsumura Oil Research Corp.) (abbreviated to P70S in Table 1) and 80% by mass of water as the sock liquid (5). The h/W value at the time was 0.06. In addition, the parison at the time had no curling and had wrinkles at a frequency of about 1 event/10 days. A stretched film was obtained in the same way as in Example 1 except for the condition mentioned above. The results based on the evaluation methods above are shown in Table 1.

Comparative Example 5

Operations were conducted in the same way as in Example 1, except for the use of a mineral oil having a specific gravity of 0.845 (Moresco White P-70S, Matsumura Oil Research Corp.) as the sock liquid (5). The h/W value at the time was 0.09. The parison (8) had weaving wrinkles (parison wrinkles) and blowouts beginning at wrinkles occurred very often during stretching, but a stretched film was barely obtained. The results based on the evaluation methods above are shown in Table 1.

Comparative Example 6

Operations were conducted in the same way as in Example 1, except for the use of a 0.1% by mass aqueous solution of a cellulose having a boiling point of 100° C. (METOLOSE 65SH-400, Shin-Etsu Chemical Co., Ltd.) (abbreviated to 65SH-400 in Table 1) as the sock liquid (5). However, the sock liquid boiled and no stable parison (8) could be obtained, making it impossible to proceed to subsequent steps. The results based on the evaluation methods above are shown in Table 1.

Comparative Example 7

Operations were conducted in the same way as in Example 1, except that the polyvinylidene chloride-based resin composition extruded in tubular form was rapidly cooled to be solidified with water at 35° C. in the cold water bath (6), and a 90% by mass aqueous solution of a propylene glycol that was the sock liquid (5) was applied to the sock (4) so that the amount of propylene glycol applied was 40 ppm. The parison (8) had poor opening properties, stretch propagation did not proceed, and blowouts occurred very often, failing to obtain a film stably and proceed to subsequent steps. The h/W value at the time was 0.02. Measurement showed that the temperature of the sock liquid (5) at a depth of about 200 mm from the liquid surface at the time was 85° C. because of the difference between the sock liquid temperature and the coolant temperature. In addition, the parison at the time had no wrinkles. The results based on the evaluation methods above are shown in Table 1.

TABLE 1

| | Sock liquid | | | | Evaluation | | | | | |
|---|---|---|---|---|---|---|---|---|---|---|
| | | Concentration | Amount applied | Sock temp. at 200-mm depth | Cold water temperature | Sock | h/W | Parison wrinkles | | |
| | Formulation | (% by mass) | (ppm) | (° C.) | (° C.) | stability | (mm/mm) | Yes/No | Evaluating | Freq. | Evaluating |
| Ex. 1 | PG | 90 | 1,500 | 55 | 10 | ◎ | 0.02 | No | ○ | No | ○ |
| Ex. 2 | PG | 90 | 800 | 60 | 23 | ◎ | 0.02 | No | ○ | No | ○ |
| Ex. 3 | DPG | 90 | 2,000 | 55 | 10 | ◎ | 0.02 | No | ○ | No | ○ |
| Ex. 4 | DPG | 90 | 1,200 | 60 | 23 | ◎ | 0.02 | No | ○ | No | ○ |
| Ex. 5 | TPG | 90 | 2,500 | 55 | 10 | ◎ | 0.02 | No | ○ | No | ○ |
| Ex. 6 | TPG | 90 | 1,500 | 60 | 23 | ◎ | 0.02 | No | ○ | No | ○ |
| Ex. 7 | PPG#400 | 90 | 3,000 | 55 | 10 | ◎ | 0.02 | No | ○ | No | ○ |
| Ex. 8 | PPG#400 | 90 | 1,800 | 60 | 23 | ◎ | 0.02 | No | ○ | No | ○ |
| Com. Ex. 1 | PG | 90 | 5,000 | 55 | 10 | ◎ | 0.02 | No | ○ | No | ○ |
| Com. Ex. 2 | PG | 90 | 20 | 55 | 10 | ◎ | 0.02 | No | ○ | No | ○ |
| Com. Ex. 3 | PG/P70S | 90/10 | 1,500 | 55 | 10 | ○ | 0.02 | Almost no | Δ | 1 event/1 month | Δ |
| Com. Ex. 4 | P70S/water | 20/80 | 1,500 | — | 10 | Δ | 0.06 | Almost no | Δ | 1 event/10 days | X |
| Com. Ex. 5 | P70S | 100 | 1,500 | — | 10 | X | 0.09 | Yes | X | — | — |
| Com. Ex. 6 | 65SH-400 | 0.1 | — | — | 10 | X | Unmeasurable | — | — | — | — |
| Com. Ex. 7 | PG | 90 | 40 | 85 | 35 | ◎ | 0.02 | No | ○ | No | ○ |

| | Evaluation | | | | | | |
|---|---|---|---|---|---|---|---|
| | Parison opening properties | | Film opening properties | Adhesion workload (at 28° C. for 1 mo.) | | Transparency | | |
| | Degree | Freq. | | mJ/25 cm² | Evaluating | Haze % | Evaluating | Droplets Evaluating | Overall |
| Ex. 1 | ○ | ○ | ○ | 2.2 | ◎ | 0.2 | ○ | ○ | ○ |
| Ex. 2 | ○ | ○ | ○ | 2.4 | ◎ | 0.1 | ○ | ◎ | ○ |
| Ex. 3 | ○ | ◎ | ○ | 2.1 | ◎ | 0.1 | ○ | ◎ | ○ |
| Ex. 4 | ○ | ◎ | ○ | 2.4 | ◎ | 0.1 | ○ | ◎ | ○ |
| Ex. 5 | ○ | ◎ | ○ | 2 | ◎ | 0.1 | ○ | ◎ | ○ |
| Ex. 6 | ○ | ◎ | ○ | 2.4 | ◎ | 0.1 | ○ | ◎ | ○ |

TABLE 1-continued

|  | | | | | | | | | |
|---|---|---|---|---|---|---|---|---|---|
| Ex. 7 | ○ | ◎ | ○ | 2 | ◎ | 0.1 | ○ | ◎ | ○ |
| Ex. 8 | ○ | ◎ | ○ | 2.2 | ◎ | 0.1 | ○ | ◎ | ○ |
| Com. Ex. 1 | ○ | ○ | ○ | 1.4 | Δ | 2.2 | X | Δ | Δ |
| Com. Ex. 2 | X | — | — | — | — | — | — | — | X |
| Com. Ex. 3 | ○ | ◎ | ○ | 1.6 | Δ | 0.9 | Δ | ○ | Δ |
| Com. Ex. 4 | ○ | ◎ | ○ | 2 | ◎ | 0.2 | ○ | ◎ | X |
| Com. Ex. 5 | ○ | — | — (wrinkles/blowouts) | 2 | ◎ | 0.2 | ○ | ◎ | X |
| Com. Ex. 6 | — | — | — | — | — | — | — | — | X |
| Com. Ex. 7 | X | — | — | — | — | — | — | — | X |

(1) h/W = difference in height between the liquid surface of the coolant and the liquid surface of the sock liquid injected into the hollow portion of the extrudate/double-ply sheet width.
(2) — indicates "not measured" or "unmeasurable."
(3) The concentration of the sock liquids of Examples 1 to 8 and Comparative Examples 1, 2, and 7 is the concentration of the liquids described in the Formulation column in an aqueous solution.
(4) The concentration of the sock liquid of Comparative Example 3 is the concentration where PG and P70S described in the Formulation column have a 90/10 mass ratio of PG/P70S.
(5) The concentration of the sock liquid of Comparative Example 4 is the concentration where P70S and water described in the Formulation column have a 20/80 mass ratio of P70S/water.
(6) The concentration of the sock liquid of Comparative Example 6 is the concentration of the cellulose (65SH-400) in the aqueous solution.
(7) The amount of sock liquid applied is the amount of the applied liquid that is compatible with water and forms one-component, expressed in mass ppm, relative to the total amount of the applied liquid and the resin forming the film or the parison. However, for Comparative Examples 3 to 5, the amount of sock liquid applied is the amount of mineral oil applied, expressed in mass ppm, relative to the total amount of the mineral oil and the resin forming the parison.

The present application is based on a Japanese patent application (Japanese Patent Application No. 2007-061380) filed on Mar. 12, 2007 which is herein incorporated by reference.

INDUSTRIAL APPLICABILITY

The wrap film of the present invention is preferable as a film for use in wrapping because the sock liquid maintains the lubricating effect as an opening agent and at the same time reduces parison width changes and meandering and eliminates parison wrinkles to achieve very stable physical properties.

The invention claimed is:

1. A wrap film made of a polyvinylidene chloride-based resin prepared by melt-extruding a polyvinylidene chloride-based resin from a die in tubular form, cooling the outer side of the extrudate with a coolant while an aqueous solution of a liquid that is compatible with water and forms one-component is retained in the hollow portion of the extrudate, and inflating the solidified extrudate, wherein the wrap film has the liquid that is compatible with water and forms one-component in applied state in amounts of 50 to 4,000 ppm, wherein the liquid that is compatible with water and forms one-component is one or more propylene glycol multimers selected from the group consisting of dipropylene glycol, tripropylene glycol, and polypropylene glycol having a weight-average molecular weight of 350 to 450.

2. The wrap film made of a polyvinylidene chloride-based resin according to claim 1, wherein the wrap film has the liquid that is compatible with water and forms one-component in applied state in amounts of 50 to 3,000 ppm.

3. The wrap film made of a polyvinylidene chloride-based resin according to claim 1 wherein the propylene glycol multimer is dipropylene glycol.

* * * * *